R. TOWARD.
HARNESS.
APPLICATION FILED DEC. 9, 1911.
1,026,723.
Patented May 21, 1912.
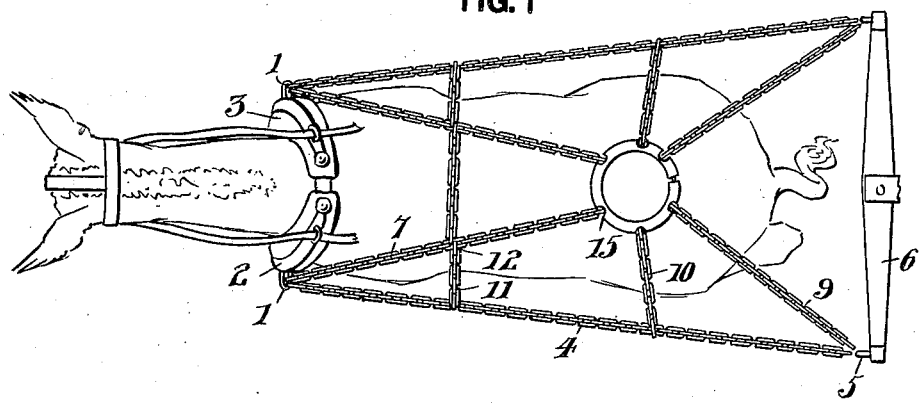
FIG. 1
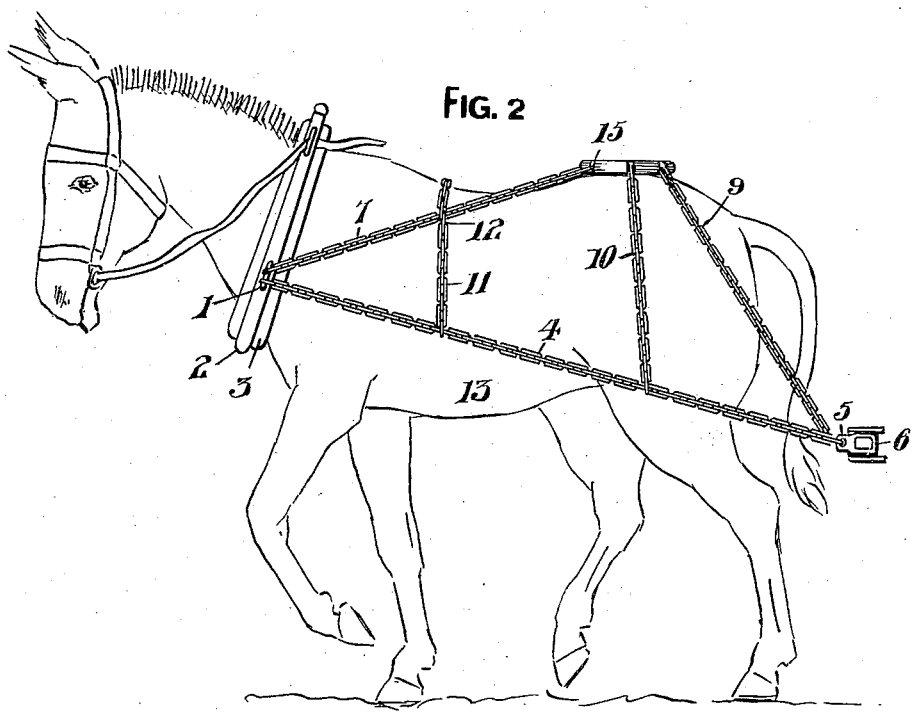
FIG. 2
FIG. 3
WITNESSES:
INVENTOR.
Ralph Toward
BY
ATTORNEYS.

UNITED STATES PATENT OFFICE.

RALPH TOWARD, OF RUSSELLTON, PENNSYLVANIA.

HARNESS.

1,026,723. Specification of Letters Patent. Patented May 21, 1912.

Application filed December 9, 1911. Serial No. 664,711.

*To all whom it may concern:*

Be it known that I, RALPH TOWARD, a citizen of the United States of America, residing at Russellton, in the county of Allegheny and State of Pennsylvania, have invented certain new and useful Improvements in Harness, of which the following is a specification, reference being had therein to the accompanying drawing.

This invention relates to harness, and the primary object of my invention is to substitute chains for various parts of a harness, thereby providing a durable and more easily applied harness that can be advantageously used in connection with drays and heavy wagons.

Another object of this invention is to furnish a harness with trace attachments that will serve functionally as anti-kicking means for the harnessed animal.

A further object of this invention is to provide a metallic harness that can be used in connection with the present type of collar and bridle, the harness being inexpensive to manufacture and highly efficient for the purposes for which it is intended.

With the above and other objects in view, the invention resides in the novel construction to be hereinafter specifically described and then claimed.

Reference will now be had to the drawing, wherein:—

Figure 1 is a plan of the improved harness as applied to a mule, Fig. 2 is a side elevation of the same, and Fig. 3 is an enlarged cross sectional view of a back ring.

The reference numerals 1 denote rings or terrets carried by the hames 2 of a collar 3, and connected to the rings 1 are the forward ends of tug chains 4, said chains having the rear ends thereof connected, as at 5 to the ends of a trace 6. The rings 1 are also connected by chains 7 to a back ring 8, and said back ring is connected by trace chains 9 to the rear end of the tug chains 4. The back ring 8 is connected by supporting chains 10 to the tug chains 4, and said tug chains are connected to the ends of a saddle chain 11. The saddle chain 11 has the links 12 thereof connected to the links of the connecting chain 7, at the inner section of the chains 7 and 11.

The back ring 8 is made of metal and to prevent the same from injuring the back of the mule 13, said ring is inclosed by a tube 14. This tube is preferably made of rubber or leather and the outer walls thereof are slotted or slitted, as at 15 to provide clearance for the links of the chains 7, 9 and 10. The rubber or leather tube 14 prevents the back of the mule from being injured and serves functionally as a center ring for the diverging chains of the harness. The trace chains 9 serve functionally the same purpose as kicking straps, it being impossible for the mule to assume the position to kick without raising its back and the forward end of the vehicle to which the animal is hitched.

The various chains are made of noncorrosive metal or metal finished whereby it will not corrode, and I reserve the right to use rubber or leather tubing upon the chains at such points where it may be necessary to prevent the chains from rubbing the hide of the animal.

What I claim is:—

A harness comprising the combination with a pair of hames, each provided with a ring, of a pair of inclined tug chains each having its forward ends connected to one of said rings, a back ring adapted to be mounted upon the horse's back, inclined trace chains connecting said back ring to the rear end of the said tug chains, inclined connecting chains connecting said back ring to the rings of the hames, a saddle chain attached at its ends to said tug chains, links for connecting the saddle chains to said connecting chains, and supporting chains connecting said back ring to said tug chains.

In testimony whereof I affix my signature in the presence of two witnesses.

RALPH TOWARD.

Witnesses:
MAX H. SROLOVITZ,
CHRISTINA T. HOOD.

Copies of this patent may be obtained for five cents each, by addressing the "Commissioner of Patents, Washington, D. C."